(12) United States Patent
Carcano et al.

(10) Patent No.: US 11,490,472 B2
(45) Date of Patent: Nov. 1, 2022

(54) POWER CONTROL SOLUTION FOR REDUCING THERMAL STRESS ON AN INTERMITTENTLY OPERABLE CHIPSET CONTROLLING RF APPLICATION FOR COOKING

(71) Applicant: Illinois Tool Works Inc., Glenview, IL (US)

(72) Inventors: Marco Carcano, Senago (IT); Michele Sclocchi, San Donato Milanese (IT); Daniele Chirico, Brugherio (IT)

(73) Assignee: Illinois Tool Works, Inc., Glenview, IL (US)

( * ) Notice: Subject to any disclaimer, the term of this patent is extended or adjusted under 35 U.S.C. 154(b) by 502 days.

(21) Appl. No.: 16/705,857

(22) Filed: Dec. 6, 2019

(65) Prior Publication Data
US 2020/0187315 A1    Jun. 11, 2020

Related U.S. Application Data

(60) Provisional application No. 62/776,097, filed on Dec. 6, 2018.

(51) Int. Cl.
| | |
|---|---|
| *H05B 6/68* | (2006.01) |
| *H05B 6/64* | (2006.01) |
| *H05B 6/66* | (2006.01) |

(52) U.S. Cl.
CPC ............. *H05B 6/687* (2013.01); *H05B 6/642* (2013.01); *H05B 6/664* (2013.01)

(58) Field of Classification Search
CPC ...... H05B 6/642; H05B 6/6473; H05B 6/664; H05B 6/686; H05B 6/687; Y02B 40/00

USPC ....... 219/725, 728, 702, 730, 745, 746, 750, 219/751, 678, 679, 680
See application file for complete search history.

(56) References Cited

U.S. PATENT DOCUMENTS

| | | | |
|---|---|---|---|
| 8,680,446 B2 * | 3/2014 | Nobue ................. | H05B 6/6494 |
| | | | 219/746 |
| 10,627,119 B2 * | 4/2020 | Carcano ................. | F24C 14/02 |
| 2016/0323939 A1 * | 11/2016 | Mattfolk ............... | H05B 6/686 |
| 2018/0146811 A1 | 5/2018 | Grimaldi | |
| 2018/0152999 A1 | 5/2018 | Rollet | |

(Continued)

FOREIGN PATENT DOCUMENTS

WO    2018125182 A1    7/2018

OTHER PUBLICATIONS

International Search Report and Written Opinion from International application No. PCT/US2019/064968 dated Mar. 24, 2020, all pages enclosed cited in its entirety.

*Primary Examiner* — Quang T Van
(74) *Attorney, Agent, or Firm* — Burr & Forman LLP

(57) ABSTRACT

Control electronics may control power amplifier electronics associated with application of RF energy generated using solid state electronic components. The power amplifier electronics may be configured to control application of RF energy in an oven according to a cooking recipe at least in part based on a learning procedure that generates a power cycling between high and low powers when the learning procedure is executed. The control electronics may include processing circuitry configured to employ a thermal stress mitigation technique to control thermal stresses on the power amplifier electronics associated with the power cycling.

20 Claims, 9 Drawing Sheets

(56) References Cited

U.S. PATENT DOCUMENTS

2018/0153000 A1    5/2018  Carcano
2019/0312555 A1*  10/2019  Brindani .................. H03F 1/52

* cited by examiner ns, in which some, but not all example embodiments are shown.

POWER CONTROL SOLUTION FOR REDUCING THERMAL STRESS ON AN INTERMITTENTLY OPERABLE CHIPSET CONTROLLING RF APPLICATION FOR COOKING

CROSS-REFERENCE TO RELATED APPLICATIONS

The present application claims priority to U.S. Provisional Application No. 62/776,097 filed on Dec. 6, 2018, the contents of which are incorporated herein by reference in its entirety.

TECHNICAL FIELD

Example embodiments generally relate to ovens and, more particularly, relate to an oven that uses radio frequency (RF) heating provided by solid state electronic components and solutions for the protection of oven components.

BACKGROUND

Combination ovens that are capable of cooking using more than one heating source (e.g., convection, steam, microwave, etc.) have been in use for decades. Each cooking source comes with its own distinct set of characteristics. Thus, a combination oven can typically leverage the advantages of each different cooking source to attempt to provide a cooking process that is improved in terms of time and/or quality. More recently, ovens with improved capabilities relative to cooking food with a combination of controllable RF energy and convection energy have been introduced. Unlike the relatively indiscriminate bombarding of food product, which generally occurs in microwave cooking, the use of controllable RF energy can enable a much more fine-tuned control of the cooking process. This fine-tuned control of the cooking process can lead to superior results in vastly shortened time periods.

Of course, RF applications have been speedily developing in other technical areas also for decades. Accordingly, it should be no surprise that the lessons, and various components and assemblies that were used in other technical areas would be applied in the area of RF cooking as this new area of technology began to develop. However, the use of well proven components from other RF applications, particularly in relation to the power amplifier electronics components, resulted in a surprising number of failures of such components. In this regard, for example, power amplifier electronics components that had been employed at high powers on a nearly continuous basis in other applications were unexpectedly failing when transferred to the oven environment where the demands on their performance seemingly decreased.

Upon investigation, the solution to the mystery of why these normally robust components were failing in what would otherwise seem to be less challenging operational circumstances than they normally face seemed straightforward. However, as will be discussed in greater detail below, the apparently straightforward solution was not the panacea expected. Accordingly, example embodiments take an alternative approach to reducing thermal stresses on components within the power amplifier electronics.

BRIEF SUMMARY OF SOME EXAMPLES

In an example embodiment, an oven is provided. The oven may include a cooking chamber configured to receive a food product, and an RF heating system configured to provide RF energy into the cooking chamber using solid state electronic components. The solid state electronic components include power amplifier electronics and control electronics configured to control operation of the power amplifier electronics. The power amplifier electronics may be configured to provide a signal into the cooking chamber via a launcher assembly operably coupled to the cooking chamber via a waveguide assembly. The power amplifier electronics may be configured to control application of RF energy into the cooking chamber according to a cooking recipe at least in part based on a learning procedure that generates a power cycling between high and low powers when the learning procedure is executed. The control electronics may be configured to employ a thermal stress mitigation technique to control thermal stresses on the power amplifier electronics associated with the power cycling.

In another example embodiment, control electronics for controlling power amplifier electronics associated with application of RF energy generated using solid state electronic components may be provided. The power amplifier electronics may be configured to control application of RF energy in an oven according to a cooking recipe at least in part based on a learning procedure that generates a power cycling between high and low powers when the learning procedure is executed. The control electronics may include processing circuitry configured to employ a thermal stress mitigation technique to control thermal stresses on the power amplifier electronics associated with the power cycling.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
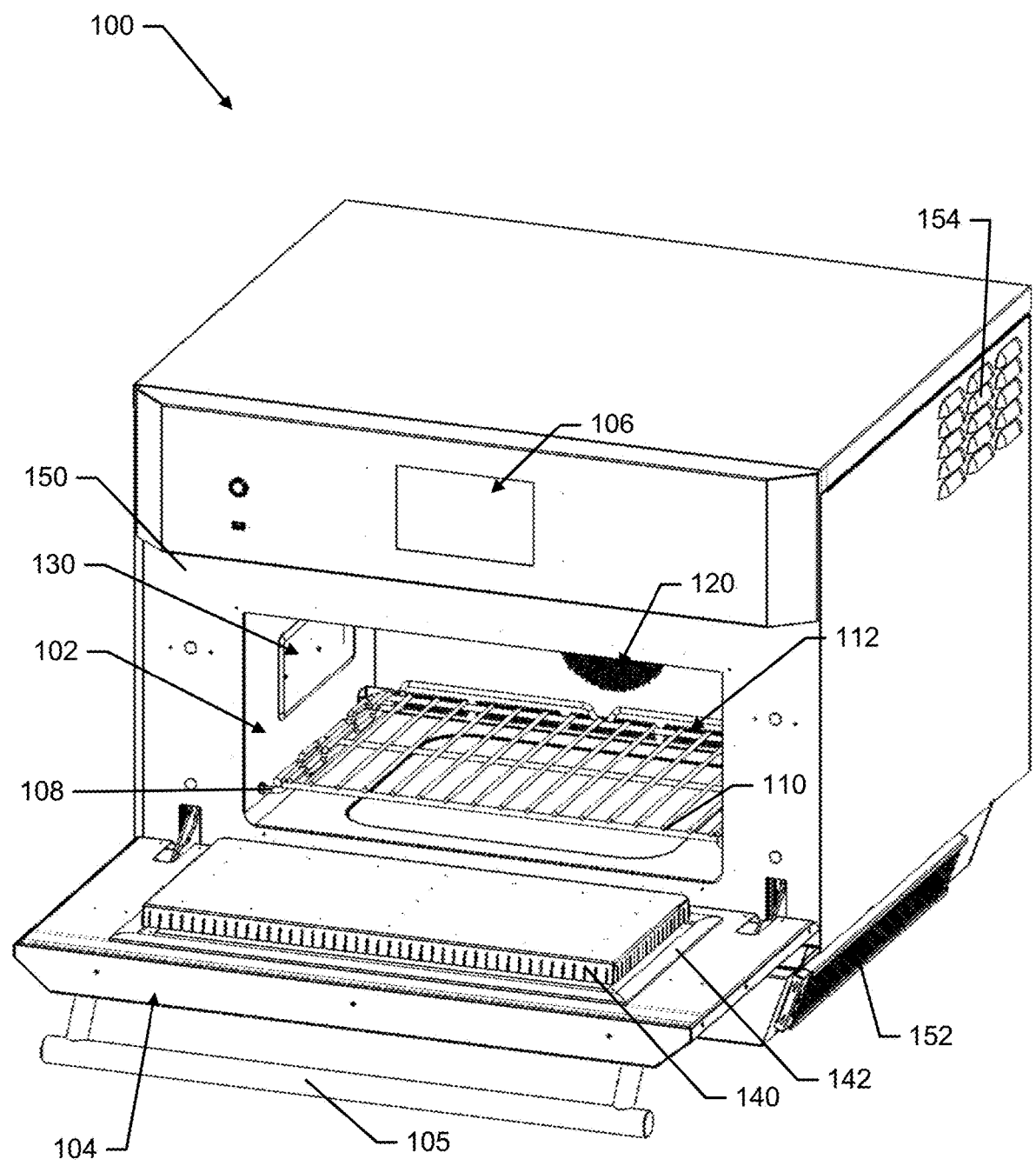
FIG. 1 illustrates a perspective view of an oven capable of employing at least two energy sources according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve the cooking performance of an oven and/or may improve the operator experience of individuals employing an example embodiment. In this regard, the oven may cook food relatively quickly and uniformly, based on the application of RF energy under the instruction of control electronics that are configured to employ protective strategies and structures to prevent damage to the control electronics as described herein.

As noted above, power amplifier electronics components that had been employed at high powers on a nearly continuous basis in other technology areas involving RF power amplifiers were unexpectedly failing in the oven environment. This was surprising since the oven environment did not require continuous operation of these components due to the fact that, as will be discussed in greater detail below, the oven cycles between high and low powers. However, upon further investigation it was determined that the connecting wires coupling high power RF sections with microwave transistors as part of impedance matching networks internal to the power amplifier electronics were the primary source of failures. The initial thought to cure this issue was to increase the size of the connecting wires and the bonding at the landing pads of components they operably couple to make them more robust relative to tolerance of the power swings associated with the thermal stresses caused by oven cycles between high and low powers. However, this intuitive solution was also ineffective since the larger sizes actually caused resonant frequencies at the frequencies of operation, which caused increased thermal stress for power cycling applications. Accordingly, another solution would be required. In this regard, some example embodiments may employ strategies for limiting temperature swings to develop temperature envelope control for the power control electronics. The temperature envelope control may be instituted in some cases via power envelope control and/or the setting of a direct current (DC) biasing current to a level that minimizes changes in temperature for RF power amplifiers. Some examples describing these solutions will be discussed below in reference to FIGS. 6-9. However, first a further description of the environmental context in which this problem arose will be discussed in reference to FIGS. 1-5.

FIG. 1 illustrates a perspective view of an oven 100 according to an example embodiment. As shown in FIG. 1, the oven 100 may include a cooking chamber 102 into which a food product may be placed for the application of heat by any of at least two energy sources that may be employed by the oven 100. The cooking chamber 102 may include a door 104 and an interface panel 106, which may sit proximate to the door 104 when the door 104 is closed. The door 104 may be operable via handle 105, which may extend across the front of the oven 100 parallel to the ground. In some cases, the interface panel 106 may be located substantially above the door 104 (as shown in FIG. 1) or alongside the door 104 in alternative embodiments. In an example embodiment, the interface panel 106 may include a touch screen display capable of providing visual indications to an operator and further capable of receiving touch inputs from the operator. The interface panel 106 may be the mechanism by which instructions are provided to the operator, and the mechanism by which feedback is provided to the operator regarding cooking process status, options and/or the like.

In some embodiments, the oven 100 may include multiple racks or may include rack (or pan) supports 108 or guide slots in order to facilitate the insertion of one or more racks 110 or pans holding food product that is to be cooked. In an example embodiment, air delivery orifices 112 may be positioned proximate to the rack supports 108 (e.g., just below a level of the rack supports in one embodiment) to enable heated air to be forced into the cooking chamber 102 via a heated-air circulation fan (not shown in FIG. 1). The heated-air circulation fan may draw air in from the cooking chamber 102 via a chamber outlet port 120 disposed at a back or rear wall (i.e., a wall opposite the door 104) of the cooking chamber 102. Air may be circulated from the chamber outlet port 120 back into the cooking chamber 102 via the air delivery orifices 112. After removal from the cooking chamber 102 via the chamber outlet port 120, air may be cleaned, heated, and pushed through the system by other components prior to return of the clean, hot and speed controlled air back into the cooking chamber 102. This air circulation system, which includes the chamber outlet port 120, the air delivery orifices 112, the heated-air circulation fan, cleaning components, and all ducting therebetween, may form a first air circulation system within the oven 100.

In an example embodiment, food product placed on a pan or one of the racks 110 (or simply on a base of the cooking chamber 102 in embodiments where racks 110 are not employed) may be heated at least partially using radio frequency (RF) energy. Meanwhile, the airflow that may be provided may be heated to enable further heating or even browning to be accomplished. Of note, a metallic pan may be placed on one of the rack supports 108 or racks 110 of some example embodiments. However, the oven 100 may be configured to employ frequencies and/or mitigation strategies for detecting and/or preventing any arcing that might otherwise be generated by using RF energy with metallic components.

In an example embodiment, the RF energy may be delivered to the cooking chamber 102 via an antenna assembly 130 disposed proximate to the cooking chamber 102. In some embodiments, multiple components may be provided in the antenna assembly 130, and the components may be placed on opposing sides of the cooking chamber 102. The antenna assembly 130 may include one or more instances of a power amplifier, a launcher, waveguide and/or the like that are configured to couple RF energy into the cooking chamber 102.

The cooking chamber 102 may be configured to provide RF shielding on five sides thereof (e.g., the top, bottom, back, and right and left sides), but the door 104 may include a choke 140 to provide RF shielding for the front side. The choke 140 may therefore be configured to fit closely with the opening defined at the front side of the cooking chamber 102 to prevent leakage of RF energy out of the cooking chamber 102 when the door 104 is shut and RF energy is being applied into the cooking chamber 102 via the antenna assembly 130.

In an example embodiment, a gasket 142 may be provided to extend around the periphery of the choke 140. In this regard, the gasket 142 may be formed from a material such as wire mesh, rubber, silicon, or other such materials that may be somewhat compressible between the door 104 and a periphery of the opening into the cooking chamber 102. The gasket 142 may, in some cases, provide a substantially air tight seal. However, in other cases (e.g., where the wire mesh is employed), the gasket 142 may allow air to pass therethrough. Particularly in cases where the gasket 142 is substantially air tight, it may be desirable to provide an air cleaning system in connection with the first air circulation system described above.

The antenna assembly 130 may be configured to generate controllable RF emissions into the cooking chamber 102 using solid state components. Thus, the oven 100 may not employ any magnetrons, but instead use only solid state components for the generation and control of the RF energy applied into the cooking chamber 102. The use of solid state components may provide distinct advantages in terms of allowing the characteristics (e.g., power/energy level, phase and frequency) of the RF energy to be controlled to a greater degree than is possible using magnetrons. However, since relatively high powers are necessary to cook food, the solid state components themselves will also generate relatively high amounts of heat, which must be removed efficiently in order to keep the solid state components cool and avoid damage thereto. To cool the solid state components, the oven 100 may include a second air circulation system.

The second air circulation system may operate within an oven body 150 of the oven 100 to circulate cooling air for preventing overheating of the solid state components that power and control the application of RF energy to the cooking chamber 102. The second air circulation system may include an inlet array 152 that is formed at a bottom (or basement) portion of the oven body 150. In particular, the basement region of the oven body 150 may be a substantially hollow cavity within the oven body 150 that is disposed below the cooking chamber 102. The inlet array 152 may include multiple inlet ports that are disposed on each opposing side of the oven body 150 (e.g., right and left sides when viewing the oven 100 from the front) proximate to the basement, and also on the front of the oven body 150 proximate to the basement. Portions of the inlet array 152 that are disposed on the sides of the oven body 150 may be formed at an angle relative to the majority portion of the oven body 150 on each respective side. In this regard, the portions of the inlet array 152 that are disposed on the sides of the oven body 150 may be tapered toward each other at an angle of about twenty degrees (e.g., between ten degrees and thirty degrees). This tapering may ensure that even when the oven 100 is inserted into a space that is sized precisely wide enough to accommodate the oven body 150 (e.g., due to walls or other equipment being adjacent to the sides of the oven body 150), a space is formed proximate to the basement to permit entry of air into the inlet array 152. At the front portion of the oven body 150 proximate to the basement, the corresponding portion of the inlet array 152 may lie in the same plane as (or at least in a parallel plane to) the front of the oven 100 when the door 104 is closed. No such tapering is required to provide a passage for air entry into the inlet array 152 in the front portion of the oven body 150 since this region must remain clear to permit opening of the door 104.

From the basement, ducting may provide a path for air that enters the basement through the inlet array 152 to move upward (under influence from a cool-air circulating fan) through the oven body 150 to an attic portion inside which control electronics (e.g., the solid state components) are located. The attic portion may include various structures for ensuring that the air passing from the basement to the attic and ultimately out of the oven body 150 via outlet louvers 154 is passed proximate to the control electronics to remove heat from the control electronics. Hot air (i.e., air that has removed heat from the control electronics) is then expelled from the outlet louvers 154. In some embodiments, outlet louvers 154 may be provided at right and left sides of the oven body 150 and at the rear of the oven body 150 proximate to the attic. Placement of the inlet array 152 at the basement and the outlet louvers 154 at the attic ensures that the normal tendency of hotter air to rise will prevent recirculation of expelled air (from the outlet louvers 154) back through the system by being drawn into the inlet array 152. Furthermore, the inlet array 152 is at least partially shielded from any direct communication path from the outlet louvers 154 by virtue of the fact that, at the oven sides (which include both portions of the inlet array 152 and outlet louvers 154), the shape of the basement is such that the tapering of the inlet array 152 is provided on walls that are also slightly inset to create an overhang 158 that blocks any air path between inlet and outlet. As such, air drawn into the inlet array 152 can reliably be expected to be air at ambient room temperature, and not recycled, expelled cooling air.

Figure 2:
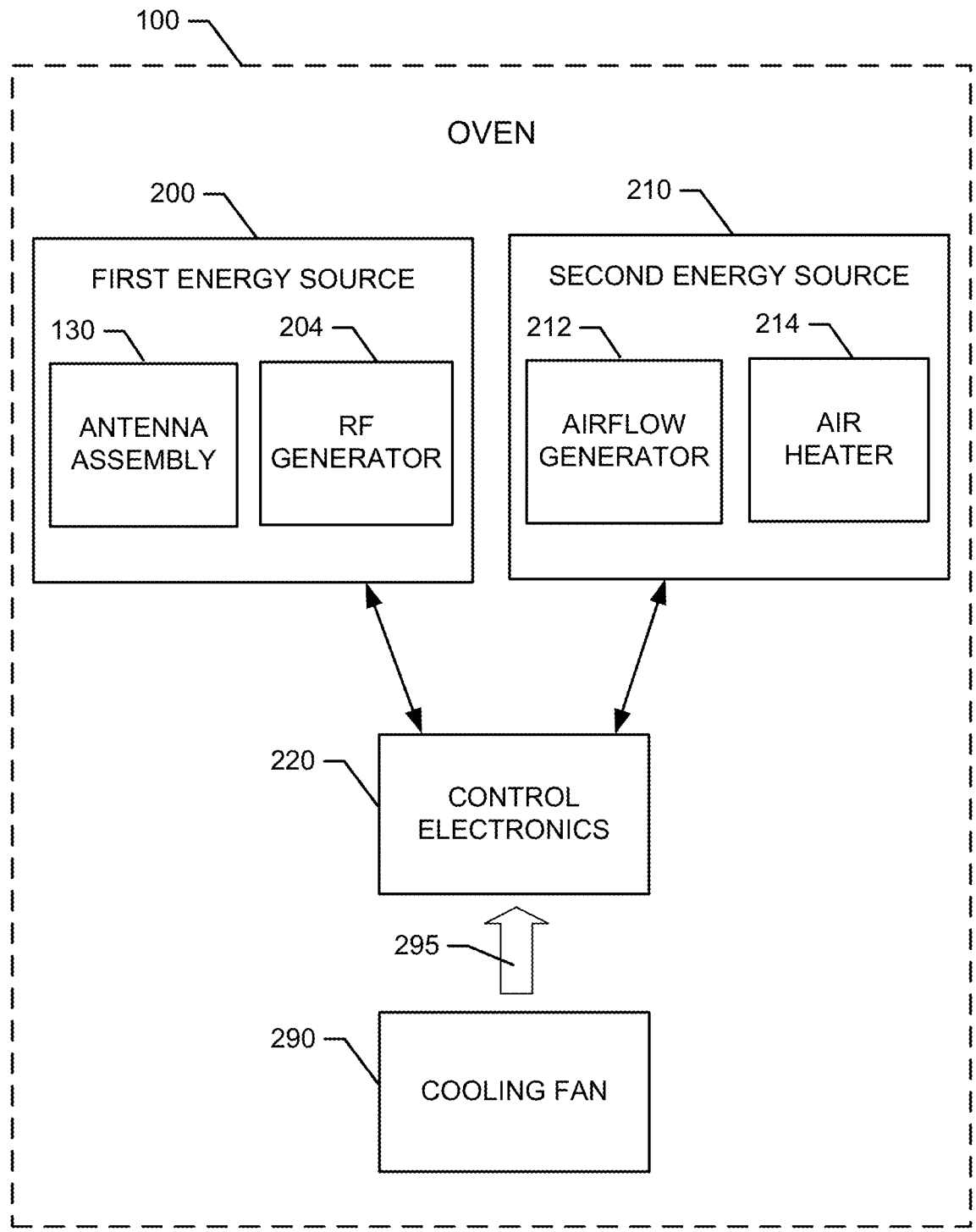
FIG. 2 illustrates a functional block diagram of the oven of FIG. 1 according to an example embodiment.

FIG. 2 illustrates a functional block diagram of the oven 100 according to an example embodiment. As shown in FIG. 2, the oven 100 may include at least a first energy source 200 and a second energy source 210. The first and second energy sources 200 and 210 may each correspond to respective different cooking methods. In some embodiments, the first and second energy sources 200 and 210 may be an RF heating source and a convective heating source, respectively. However, it should be appreciated that additional or alternative energy sources may also be provided in some embodiments. Moreover, some example embodiments could be practiced in the context of an oven that includes only a single energy source (e.g., the second energy source 210). As such, example embodiments could be practiced on otherwise conventional ovens that apply heat using, for example, gas or electric power for heating.

As mentioned above, the first energy source 200 may be an RF energy source (or RF heating source) configured to generate relatively broad spectrum RF energy or a specific narrow band, phase controlled energy source to cook food product placed in the cooking chamber 102 of the oven 100. Thus, for example, the first energy source 200 may include the antenna assembly 130 and an RF generator 204. The RF generator 204 of one example embodiment may be configured to generate RF energy at selected levels and with selected frequencies and phases. In some cases, the frequencies may be selected over a range of about 6 MHz to 246 GHz. However, other RF energy bands may be employed in some cases. In some examples, frequencies may be selected from unlicensed frequency (e.g., the ISM) bands for application by the RF generator 204.

In some cases, the antenna assembly 130 may be configured to transmit the RF energy into the cooking chamber 102 and receive feedback to indicate absorption levels of respective different frequencies in the food product. The absorption levels may then be used to control the generation of RF energy to provide balanced cooking of the food product. Feedback indicative of absorption levels is not necessarily employed in all embodiments however. For example, some embodiments may employ algorithms for selecting frequency and phase based on pre-determined strategies identified for particular combinations of selected cook times, power levels, food types, recipes and/or the like. In some embodiments, the antenna assembly 130 may include multiple antennas, waveguides, launchers, and RF transparent coverings that provide an interface between the antenna assembly 130 and the cooking chamber 102. Thus, for example, four waveguides may be provided and, in some cases, each waveguide may receive RF energy generated by its own respective power module or power amplifier of the RF generator 204 operating under the control of control electronics 220. In an alternative embodiment, a single multiplexed generator may be employed to deliver different energy into each waveguide or to pairs of waveguides to provide energy into the cooking chamber 102.

In an example embodiment, the second energy source 210 may be an energy source capable of inducing browning and/or convective heating of the food product. Thus, for example, the second energy source 210 may a convection heating system including an airflow generator 212 and an air heater 214. The airflow generator 212 may be embodied as or include the heated-air circulation fan or another device capable of driving airflow through the cooking chamber 102 (e.g., via the air delivery orifices 112). The air heater 214 may be an electrical heating element or other type of heater that heats air to be driven toward the food product by the airflow generator 212. Both the temperature of the air and the speed of airflow will impact cooking times that are achieved using the second energy source 210, and more particularly using the combination of the first and second energy sources 200 and 210.

In an example embodiment, the first and second energy sources 200 and 210 may be controlled, either directly or indirectly, by the control electronics 220. The control electronics 220 may be configured to receive inputs descriptive of the selected recipe, food product and/or cooking conditions in order to provide instructions or controls to the first and second energy sources 200 and 210 to control the cooking process. In some embodiments, the control electronics 220 may be configured to receive static and/or dynamic inputs regarding the food product and/or cooking conditions. Dynamic inputs may include feedback data regarding phase and frequency of the RF energy applied to the cooking chamber 102. In some cases, dynamic inputs may include adjustments made by the operator during the cooking process. The static inputs may include parameters that are input by the operator as initial conditions. For example, the static inputs may include a description of the food type, initial state or temperature, final desired state or temperature, a number and/or size of portions to be cooked, a location of the item to be cooked (e.g., when multiple trays or levels are employed), a selection of a recipe (e.g., defining a series of cooking steps) and/or the like.

In some embodiments, the control electronics 220 may be configured to also provide instructions or controls to the airflow generator 212 and/or the air heater 214 to control airflow through the cooking chamber 102. However, rather than simply relying upon the control of the airflow generator 212 to impact characteristics of airflow in the cooking chamber 102, some example embodiments may further employ the first energy source 200 to also apply energy for cooking the food product so that a balance or management of the amount of energy applied by each of the sources is managed by the control electronics 220.

In an example embodiment, the control electronics 220 may be configured to access algorithms and/or data tables that define RF cooking parameters used to drive the RF generator 204 to generate RF energy at corresponding levels, phases and/or frequencies for corresponding times determined by the algorithms or data tables based on initial condition information descriptive of the food product and/or based on recipes defining sequences of cooking steps. As such, the control electronics 220 may be configured to employ RF cooking as a primary energy source for cooking the food product, while the convective heat application is a secondary energy source for browning and faster cooking. However, other energy sources (e.g., tertiary or other energy sources) may also be employed in the cooking process.

In some cases, cooking signatures, programs or recipes may be provided to define the cooking parameters to be employed for each of multiple potential cooking stages or steps that may be defined for the food product and the control electronics 220 may be configured to access and/or execute the cooking signatures, programs or recipes (all of which may generally be referred to herein as recipes). In some embodiments, the control electronics 220 may be configured to determine which recipe to execute based on inputs provided by the user except to the extent that dynamic inputs (i.e., changes to cooking parameters while a program is already being executed) are provided. In an example embodiment, an input to the control electronics 220 may also include browning instructions. In this regard, for example, the browning instructions may include instructions regarding the air speed, air temperature and/or time of application of a set air speed and temperature combination (e.g., start and stop times for certain speed and heating combinations). The browning instructions may be provided via a user interface accessible to the operator, or may be part of the cooking signatures, programs or recipes.

As discussed above, the first air circulation system may be configured to drive heated air through the cooking chamber 102 to maintain a steady cooking temperature within the cooking chamber 102. Meanwhile, the second air circulation system may cool the control electronics 220. The first and second air circulation systems may be isolated from each other. However, each respective system generally uses differential pressures (e.g., created by fans) within various compartments formed in the respective systems to drive the corresponding air flows needed for each system. While the airflow of the first air circulation system is aimed at heating food in the cooking chamber 102, the airflow of the second air circulation system is aimed at cooling the control electronics 220. As such, cooling fan 290 provides cooling air 295 to the control electronics 220, as shown in FIG. 2.

The structures that form the air cooling pathways via which the cooling fan 290 cools the control electronics 220 may be designed to provide efficient delivery of the cooling air 295 to the control electronics 220, but also minimize fouling issues or dust/debris buildup in sensitive areas of the oven 100, or areas that are difficult to access and/or clean. Meanwhile, the structures that form the air cooling pathways may also be designed to maximize the ability to access and clean the areas that are more susceptible to dust/debris buildup. Furthermore, the structures that form the air cooling pathways via which the cooling fan 290 cools the control electronics 220 may be designed to strategically employ various natural phenomena to further facilitate efficient and effective operation of the second air circulation system. In this regard, for example, the tendency of hot air to rise, and the management of high pressure and low pressure zones necessarily created by the operation of fans within the system may each be employed strategically by the design and placement of various structures to keep certain areas that are hard to access relatively clean and other areas that are otherwise relatively easy to access more likely to be places where cleaning is needed.

Figure 3:
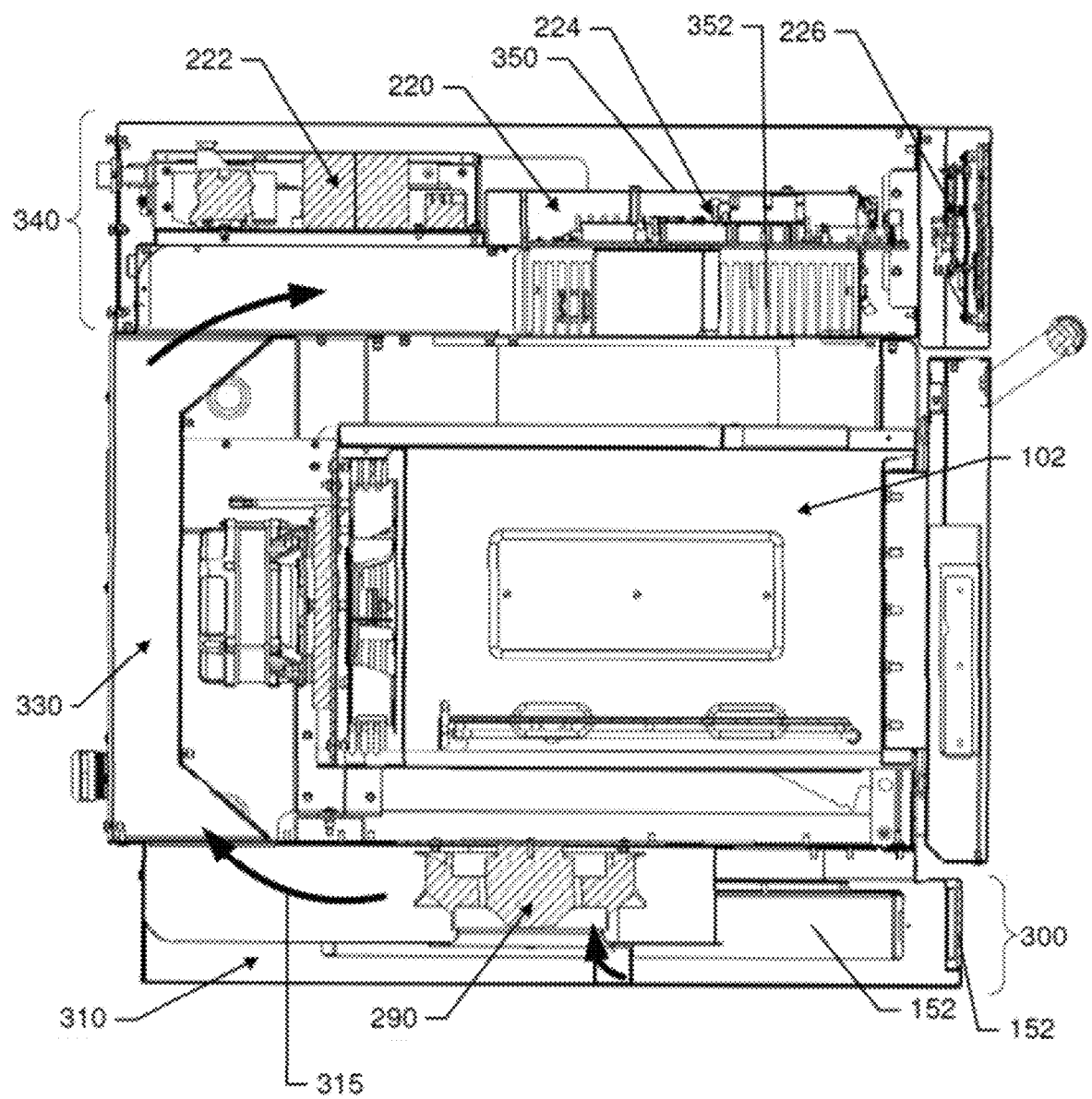
FIG. 3 shows a cross sectional view of the oven from a plane passing from the front to the back of the oven according to an example embodiment.

The typical airflow path, and various structures of the second air circulation system, can be seen in FIG. 3. In this regard, FIG. 3 shows a cross sectional view of the oven 100 from a plane passing from the front to the back of the oven 100. The basement (or basement region 300) of the oven 100 is defined below the cooking chamber 102, and includes an inlet cavity 310. During operation, air is drawn into the inlet cavity 310 through the inlet array 152 and is further drawn into the cooling fan 290 before being forced radially outward (as shown by arrow 315) away from the cooling fan 290 into a riser duct 330 (e.g., a chimney) that extends from the basement region 300 to the attic (or attic region 340) to turn air upward (as shown by arrow 315). Air is forced upward through the riser duct 330 into the attic region 340, which is where components of the control electronics 220 are disposed. The air then cools the components of the control electronics 220 before exiting the body 150 of the oven 100 via the outlet louvers 154. The components of the control electronics 220 may include power supply electronics 222, power amplifier electronics 224 and display electronics 226.

Upon arrival of air into the attic region 340, the air is initially guided from the riser duct 330 to a power amplifier casing 350. The power amplifier casing 350 may house the power amplifier electronics 224. In particular, the power amplifier electronics 224 may sit on an electronic board to which all such components are mounted. The power amplifier electronics 224 may therefore include one or more power amplifiers that are mounted to the electronic board for powering the antenna assembly 130. Thus, the power amplifier electronics 224 may generate a relatively large heat load. To facilitate dissipation of this relatively large heat load, the power amplifier electronics 224 may be mounted to one or more heat sinks 352. In other words, the electronic board may be mounted to the one or more heat sinks 352. The heat sinks 352 may include large metallic fins that extend away from the circuit board to which the power amplifier electronics 224 are mounted. Thus, the fins may extend downwardly (toward the cooking chamber 102). The fins may also extend in a transverse direction away from a centerline (from front to back) of the oven 100 to guide air provided into the power amplifier casing 350 and past the fins of the heat sinks 352.

Figure 4:
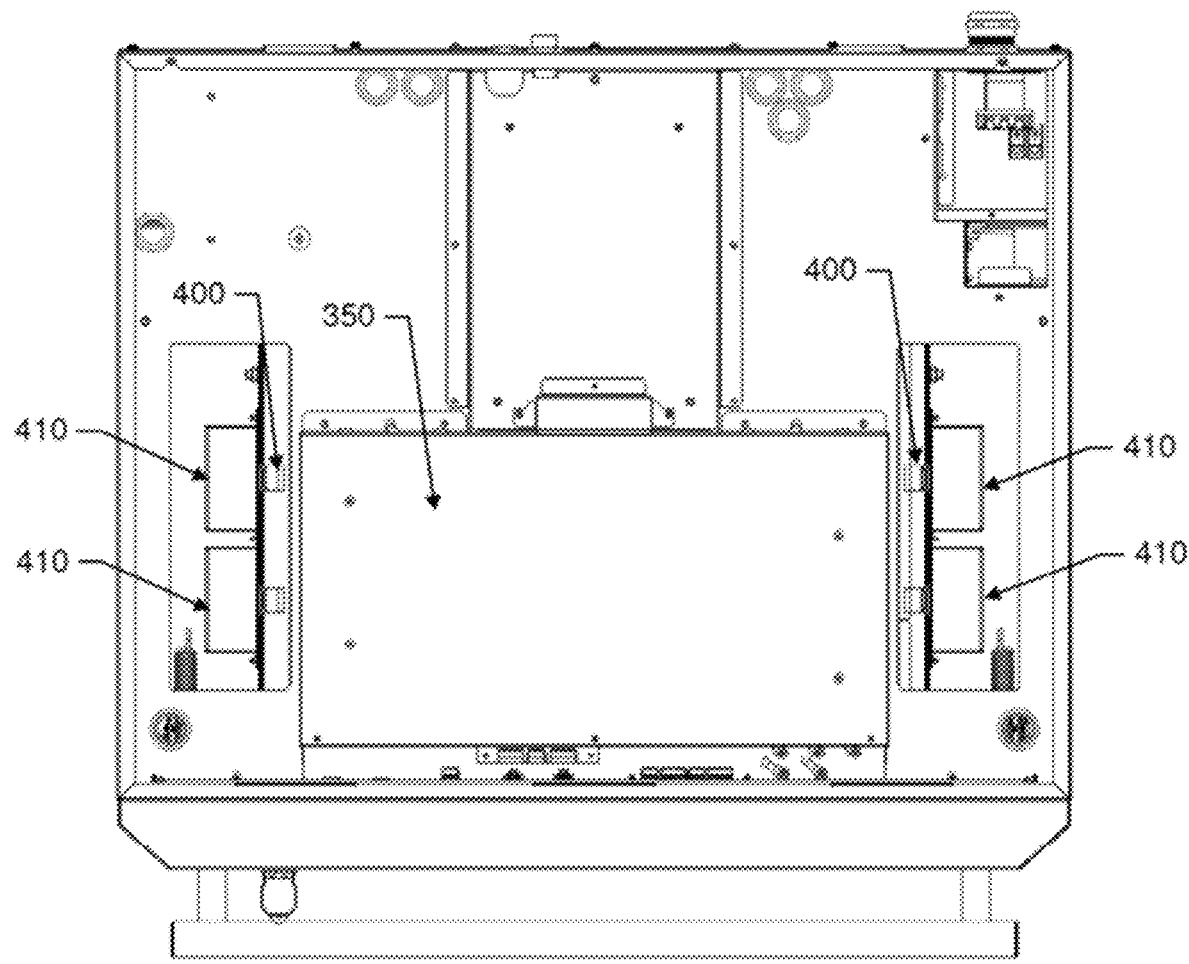
FIG. 4 is a top view of an attic region of the oven in accordance with an example embodiment.

FIG. 4 illustrates a top view of the attic region 340, and shows the power amplifier casing 350 and various components of the antenna assembly 130 including a launcher assembly 400 and waveguides of a waveguide assembly 410. Power is provided from the power amplifier electronics 224 to each launcher of the launcher assembly 400. The launcher assembly 400 operably couples a signal generated by the power amplifiers of the power amplifier electronics 224 into a corresponding one of the waveguides of the waveguide assembly 410 for communication of the corresponding signal into the cooking chamber 102 via the antenna assembly 130 as described above.

The power amplifier electronics 224 are defined by a plurality of electronic circuitry components including opamps, transistors and/or the like that are configured to generate waveforms at the corresponding power levels, frequencies and phases that are desired for a particular situation or cooking program. In some cases, the cooking program may select an algorithm for control of the power amplifier electronics 224 to direct RF emissions into the cooking chamber 102 at selected power levels, frequencies and phases. One or more learning processes may be initiated to select one or more corresponding algorithms to guide the power application. The learning processes may include detection of feedback on the efficacy of the application of power at specific frequencies (and/or phases) into the cooking chamber 102. In order to determine the efficacy, in some cases, the learning processes may measure efficiency and compare the efficiency to one or more thresholds. Efficiency may be calculated as the difference between forward power ($P_{fwd}$) and reflected power ($P_{refl}$, divided by the forward power ($P_{fwd}$). As such, for example, the power inserted into the cooking chamber 102 (i.e., the forward power) may be measured along with the reflected power to determine the amount of power that has been absorbed in the food product (or workload) inserted in the cooking chamber 102. The efficiency may then be calculated as: Efficiency (eff)=$(P_{fwd} - P_{refl})/P_{fwd}$.

As can be appreciated from the description above, the measurement of the efficiency of the delivery of RF energy to the food product may be useful in determining how effective a particular (e.g., a current) selection for a combination (or pair) of frequency and phase parameters of RF energy applied into the cooking chamber 102 is at delivering heat energy to the food product. Thus, the measurement of efficiency may be useful for selecting the best combination or algorithm for application of energy. The measurement of efficiency should therefore also desirably be as accurate as possible in order to ensure that meaningful control is affected by monitoring efficiency.

Figure 5:
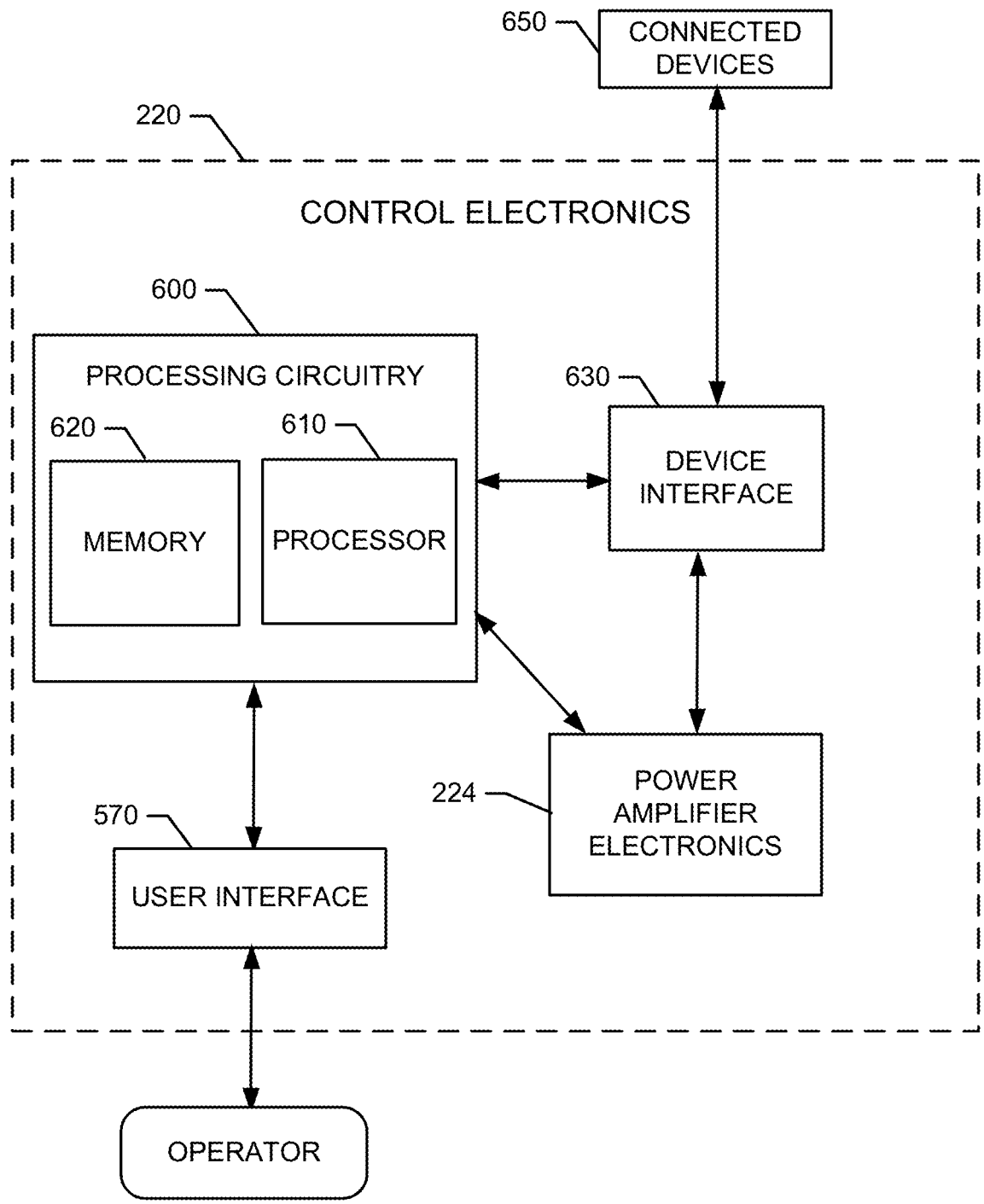
FIG. 5 is a block diagram of control electronics for providing the electronic circuitry for controlling RF application in the oven in accordance with an example embodiment.

FIG. 5 is a block diagram of control electronics 220 for providing the electronic circuitry for instantiation of power cycling during oven operation in accordance with an example embodiment. In some embodiments, the control electronics 220 may include or otherwise be in communication with processing circuitry 600 that is configurable to perform actions in accordance with example embodiments described herein. As such, for example, the functions attributable to the control electronics 220 may be carried out by the processing circuitry 600.

The processing circuitry 600 may be configured to perform data processing, control function execution and/or other processing and management services according to an example embodiment of the present invention. In some embodiments, the processing circuitry 600 may be embodied as a chip or chip set. In other words, the processing circuitry 600 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 600 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 600 may include one or more instances of each of a processor 610 and memory 620 that may be in communication with or otherwise control a device interface 630 and the user interface 570. As such, the processing circuitry 600 may be embodied as a circuit chip (e.g., an integrated circuit chip) configured (e.g., with hardware, software or a combination of hardware and software) to perform operations described herein. However, in some embodiments, the processing circuitry 600 may be embodied as a portion of an on-board computer.

The user interface 570 (which may be embodied as, include, or be a portion of the interface panel 106) may be in communication with the processing circuitry 600 to receive an indication of a user input at the user interface 570 and/or to provide an audible, visual, mechanical or other output to the user (or operator). As such, the user interface 570 may include, for example, a display (e.g., a touch screen such as the interface panel 106), one or more hard or soft buttons or keys, and/or other input/output mechanisms.

The device interface 630 may include one or more interface mechanisms for enabling communication with connected devices 650 such as, for example, other components of the oven 100, sensors of a sensor network of the oven 100, removable memory devices, wireless or wired network communication devices, and/or the like. In some cases, the device interface 630 may be any means such as a device or circuitry embodied in either hardware, or a combination of hardware and software that is configured to receive and/or transmit data from/to sensors that measure any of a plurality of device parameters such as frequency, phase, temperature (e.g., in the cooking chamber 102 or in air passages associated with the second energy source 210), air speed, and/or the like. As such, in one example, the device interface 630 may receive input at least from a temperature sensor that measures the temperatures described above, or receives input from any of the other parameters described above, in order to enable communication of such parameters to the processing circuitry 600 for the performance of certain protective or control functions. Alternatively or additionally, the device interface 630 may provide interface mechanisms for any devices capable of wired or wireless communication with the processing circuitry 600. In still other alternatives, the device interface 630 may provide connections and/or interface mechanisms to enable the processing circuitry 600 to control the various components of the oven 100.

In an exemplary embodiment, the memory 620 may include one or more non-transitory memory devices such as, for example, volatile and/or non-volatile memory that may be either fixed or removable. The memory 620 may be configured to store information, data, cooking signatures, programs, recipes, applications, instructions or the like for enabling the control electronics 220 to carry out various functions in accordance with example embodiments of the present invention. For example, the memory 620 could be configured to buffer input data for processing by the processor 610. Additionally or alternatively, the memory 620 could be configured to store instructions for execution by the processor 610. As yet another alternative, the memory 620 may include one or more databases that may store a variety of data sets responsive to input from the sensor network, or responsive to programming of any of various cooking programs. Among the contents of the memory 620, applications may be stored for execution by the processor 610 in order to carry out the functionality associated with each respective application. In some cases, the applications may include control applications that utilize parametric data to control the application of heat by the first and second energy sources 200 and 210 as described herein. In this regard, for example, the applications may include operational guidelines defining expected cooking speeds for given initial parameters (e.g., food type, size, initial state, location, and/or the like) using corresponding tables of frequencies, phases, RF energy levels, temperatures and air speeds. Thus, some applications that may be executable by the processor 610 and stored in memory 620 may include tables defining combinations of RF energy parameters and air speed and temperature to determine cooking times for certain levels of doneness and/or for the execution of specific cooking recipes. Accordingly, different cooking programs can be executed to generate different RF and/or convective environments to achieve the desired cooking results. In still other examples, data tables may be stored to define calibration values and/or diagnostic values, as described above. Alternatively or additionally, the memory 620 may store applications for defining responses to stimuli including the generation of protective actions and/or notification functions. In some example embodiments, the memory 620 may store power envelope control and/or temperature envelope control algorithms as described in greater detail below.

The processor 610 may be embodied in a number of different ways. For example, the processor 610 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 610 may be configured to execute instructions stored in the memory 620 or otherwise accessible to the processor 610. As such, whether configured by hardware or by a combination of hardware and software, the processor 610 may represent an entity (e.g., physically embodied in circuitry—such as in the form of processing circuitry 600) capable of performing operations according to example embodiments of the present invention while configured accordingly. Thus, for example, when any instance of the processor 610 is embodied as an ASIC, FPGA or the like, the processor 610 may be specifically configured hardware for conducting the operations described herein. Alternatively, as another example, when the processor 610 is embodied as one or more executors of software instructions, the instructions may specifically configure the processor 610 to perform the operations described herein.

In an example embodiment, the processor 610 (or the processing circuitry 600) may be embodied as, include or otherwise control the control electronics 220 and/or the power amplifier electronics 224. As such, in some embodiments, the processor 610 (or the processing circuitry 600) may be said to cause each of the operations described in connection with the control electronics 220 and/or the power amplifier electronics 224 by directing the control electronics 220 and/or the power amplifier electronics 224, respectively, to undertake the corresponding functionalities responsive to execution of instructions or algorithms configuring the processor 610 (or processing circuitry 600) accordingly. As an example, the control electronics 220 may be configured to control the responses to various stimuli associated with executing the learning procedure discussed above and directing RF application within the oven 100 based on the learning procedure. Moreover, the control electronics 220 may be configured to determine efficiency parameters and take protective actions based on the efficiency parameters, or based on individual ones of the values, measurements and/or parameters that are determined by or received at the control electronics 220 for execution of the learning procedure. In some cases, a separate instance of a processor (or processors) and memory may be associated with different parts of the control electronics 220 (e.g., including separate processors for the control of the power amplifier electronics 224 amongst potentially others).

In an example embodiment, the control electronics 220 may also access and/or execute instructions for control of the RF generator 204 and/or the antenna assembly 130 to control the application of RF energy to the cooking chamber 102. Thus, for example, the operator may provide static inputs to define the type, mass, quantity, or other descriptive parameters (e.g., a recipe) related to the food product(s)

disposed within the cooking chamber 102. The control electronics 220 may then utilize the static inputs to locate an algorithm or other program for execution to define the application of RF energy and/or convective energy to be applied within the cooking chamber 102. The control electronics 220 may also monitor dynamic inputs to modify the amount, frequency, phase or other characteristics of the RF energy to be applied within the cooking chamber 102 during the cooking process, and may also perform protective functions. Finally, the control electronics 220 may execute instructions for calibration and/or fault analysis. Accordingly, for example, the control electronics 220 may be configured to act locally to protect the power amplifier electronics 224 via stopping RF application to the cooking chamber 102, via making adjustments to components to provide calibrated outputs, and/or via alerting the user when various abnormal or correctable situations are detected.

In some embodiments, efficiency calculations may be made periodically throughout the cooking process as part of a learning process. In this regard, the control electronics 220 may be configured to extrapolate, calculate or otherwise determine the amount of energy to be directed into food product (i.e., forward power value 520), and the amount of energy reflected back from the cooking chamber 102 (i.e., the reflected power value 522) so that an accurate estimate of the absorbed power (or energy) can be estimated, and the efficiency parameter can be determined. The control electronics 220 may then control operation of the RF generator 204 and/or the antenna assembly 130 based on the measured efficiency as part of a calibration or cooking process. Thus, for example, if a learning process is performed during cooking, the measured efficiency may be expected to be at least above a threshold value (e.g., 40%) whenever there is a food product or load in the cooking chamber 102. If efficiency is below the threshold value, the control electronics 220 may communicate with the user interface 570 to let the user know to check the cooking chamber 102 to make sure that there is a load therein. Discrete efficiency measurements may be made at any desirable interval (e.g., every 100 msec) to perform the protective or alert functions described herein. If reflected power is very high, the power amplifier electronics 224 may be shutdown. If certain temperatures of components (e.g., one or both of the heat sinks 352, the processor 610, or air temperatures) are too high, an alarm may be provided through the user interface 570 and/or the power amplifier electronics 224 may be shutdown. Other protective actions are also possible.

One aspect of the oven 100 of example embodiments that enables the oven 100 to provide an improvement in cooking capability is therefore the fact that the power amplifier electronics 224 employ the learning procedure described above. The learning procedure may be performed and then followed by the application of RF energy at amplitudes, phases and/or frequencies that are selected based on the most efficient combinations learned from the learning procedure. This process can be cyclic in that the learning procedure can be repeated several times during a cooking operation in order to ensure maximum efficiency as properties of the food product change due to cooking. Accordingly, power levels may cycle between high and lower levels during the learning/cooking cycles. As noted above, these cycles between high and low powers can generate thermal stresses on components of the power amplifier electronics 224.

Figure 6:
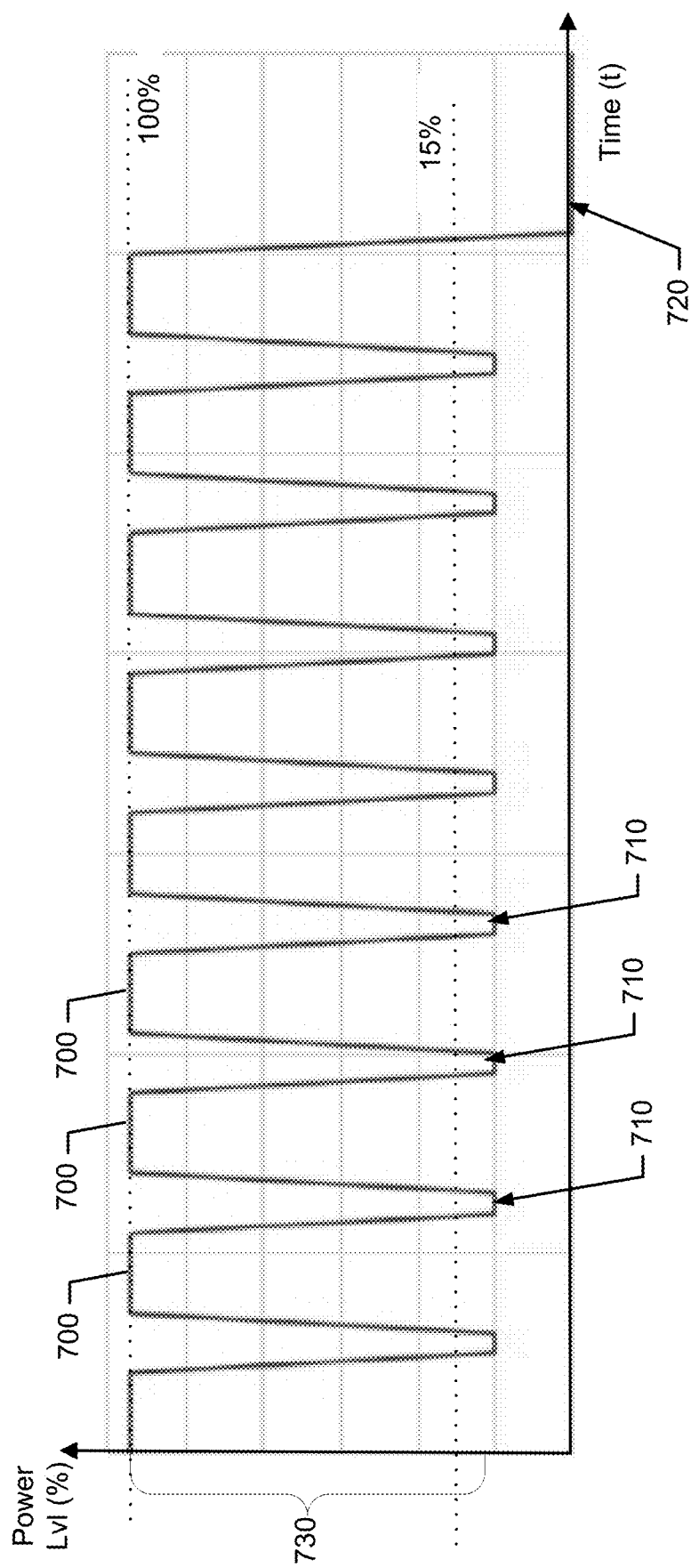
FIG. 6 illustrates a power versus time graph associated with a power cycling oven in accordance with an example embodiment.

FIG. 6 illustrates a graph of how power levels may change in the oven 100 when the oven 100 employs a cooking strategy that utilizes the learning procedure described above. The graph of FIG. 6 illustrates power level versus time. In this regard, the power levels are high (e.g., at or about 100%) during periods where cooking is being accomplished (i.e., cooking periods 700). During the cooking periods 700, a selected phase and/or frequency combination may be applied to the food product based on the information learned by application of the learning procedure described above. Meanwhile, power decreases significantly (e.g., less than 10% or 15%) during learning periods 710, when different frequency and/or phase combinations are applied to the food product to determine the most efficient combinations for continued cooking (i.e., during a subsequent occurrence of the cooking period 700). Then, after the cooking process is completed, an end of recipe period 720 may exist during which time the RF power application is essentially zero, and RF is turned off. During the recipe execution time (i.e., the time that includes all cooking and learning periods 700 and 710, and excludes the end of recipe period 720), a power envelope 730 is defined. As shown in FIG. 6, if the minimum power during the learning periods 710 is allowed to reduce to levels below about 15%, the power envelope 730 can be larger than 85%.

Figure 9:
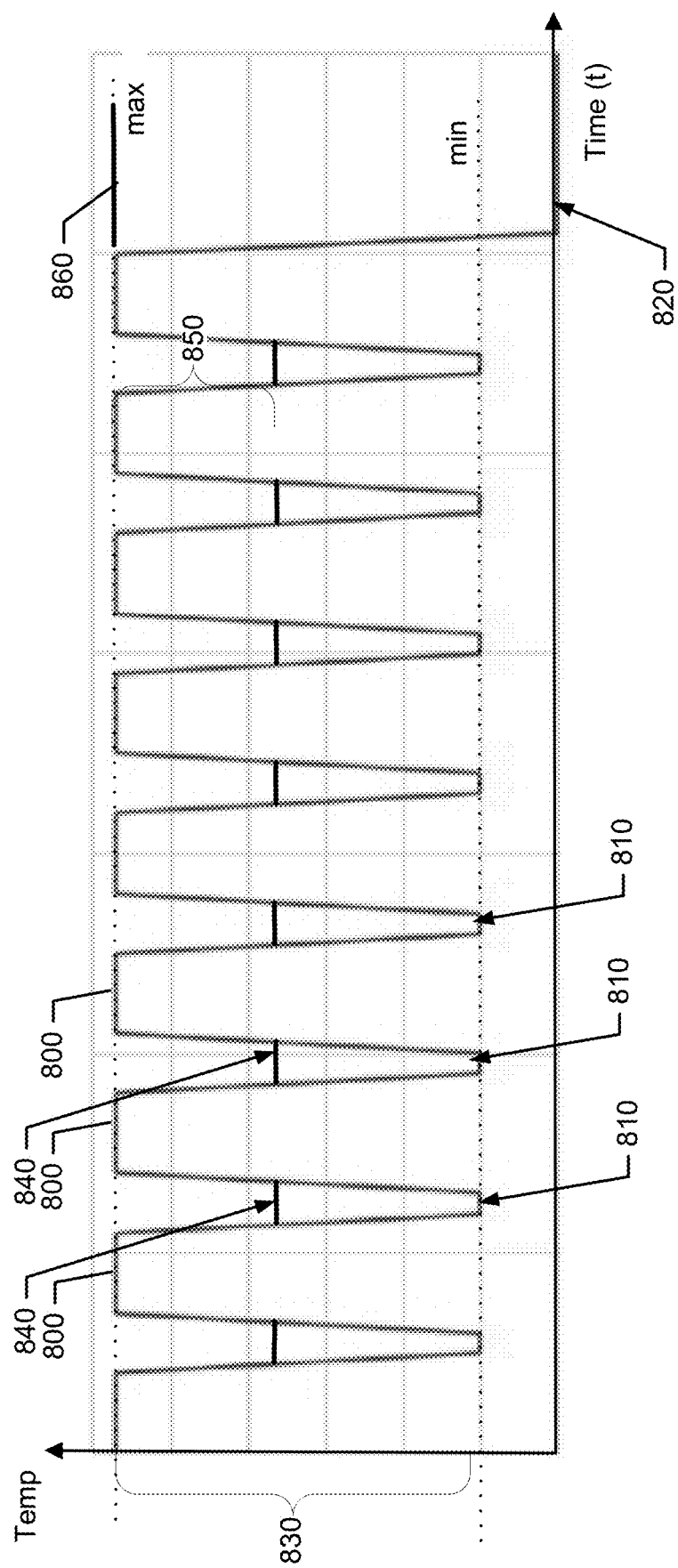
FIG. 9 illustrates temperature versus time graph for the various power versus time graphs of FIGS. 6-8 in accordance with an example embodiment.

FIG. 9 shows a corresponding graph of temperature versus time for the power graph of FIG. 6. In this regard, maximum operating temperature periods 800 generally correspond to the cooking periods 700 of FIG. 6. Meanwhile, minimum operating temperature periods 810 generally correspond to the learning periods 710 of FIG. 6. During the end of recipe period 720, an absolute minimum temperature period 820 may be defined as the power amplifier electronics 224 cool to a minimum temperature. The difference between the maximum and minimum temperatures experienced during the maximum operating temperature periods 800 and minimum operating temperature periods 810 may define an operating temperature envelope 830. As can be appreciated from FIG. 9, the operating temperature envelope 830 may be quite large for the operating conditions shown in FIG. 6.

Figure 7:
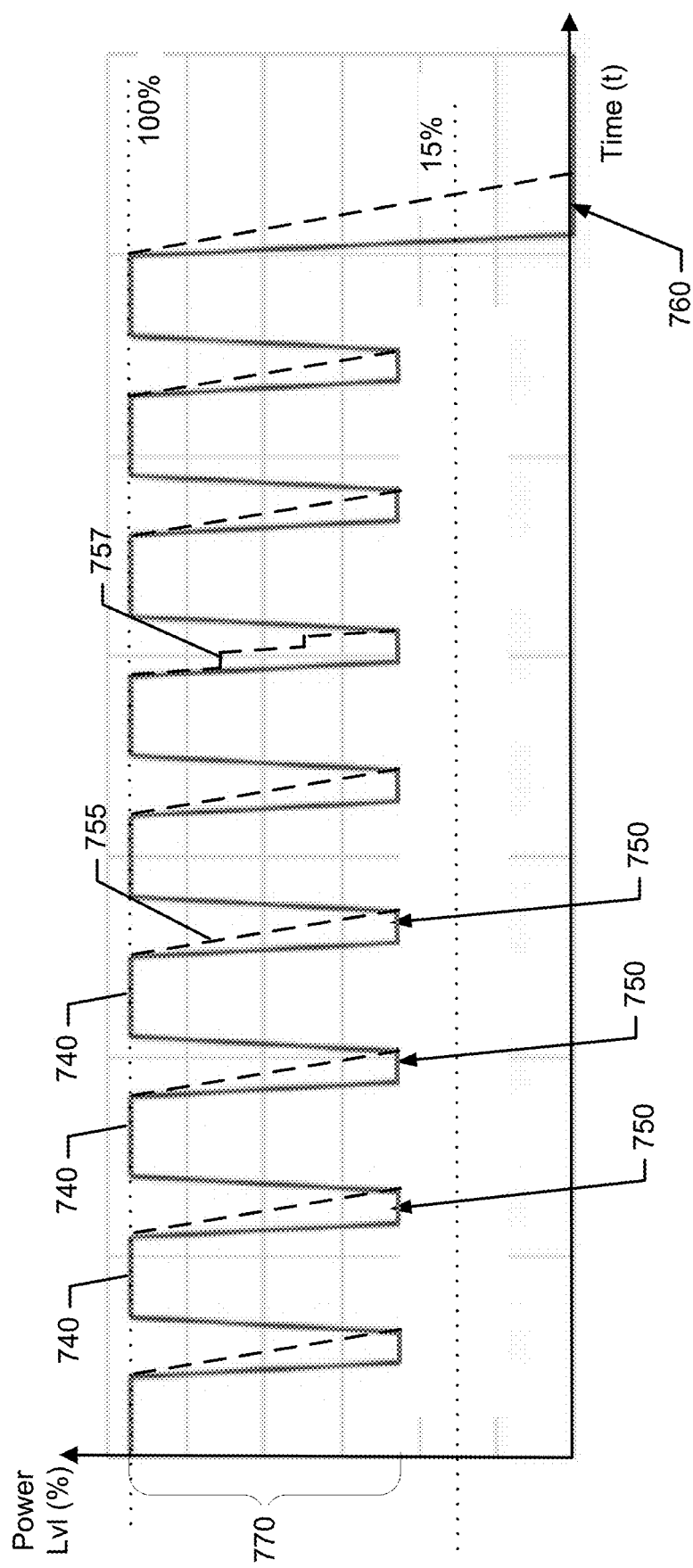
FIG. 7 is a power versus time graph for control electronics of the oven configured to employ a thermal stress mitigation technique in accordance with an example embodiment.

To reduce the operating temperature envelope 830, a number of strategies may be employed. One such strategy is shown in FIG. 7. In this regard, for example, the control electronics 220 may be configured to control operation of the RF generator 204 to define a minimum RF power generation level during the learning periods so that lower RF power swings are experienced. In this regard, as shown in FIG. 7, power levels may still be high (e.g., at or about 100%) during periods where cooking is being accomplished (i.e., cooking periods 740). During the cooking periods 740, the selected phase and/or frequency combinations that are applied to the food product based on the information learned by application of the learning procedure described above may essentially remain unchanged from the example described in reference to FIG. 6. However, power decreases during learning periods 750 may be retained at a higher level to ensure that RF power levels are not allowed to decrease below about 15%. As such, for example, the control electronics 220 may ensure that a minimum RF power during the learning periods 750 never decreases below about 15%. This may be accomplished in multiple ways. In one example, the processing circuitry 600 of the control electronics 220 may be configured to direct the power amplifier electronics 224 to continue to generate RF power at a level at least higher than 15%. In another example, the processing circuitry 600 may be configured to institute a power reduction delay. The power reduction delay may effectively smooth the transitions between high and low power cycles. In some cases, the power reduction delay may alter the continuity (e.g., slope) of the power reduction either by instituting a continuous delay (shown by curve 755) or by instituting discrete steps of reduction (shown by curve 757), where the transient times for the steps range from 10 ms to 1 s in some cases. Of note, power increase delays could also (or alternatively) be employed. Thus, for example, the delay curves (755 and 757) could alternatively operate in the other direction (or in both directions) for power transients under the control of the processing circuitry 600. In either case, transitions may be smoothed or slowed so that ultimately the difference in power between the cooking periods 740 and the learning periods 750 is reduced.

In the example of FIG. 7, the end of recipe period 760 may remain unchanged (i.e., returning essentially to a zero power level). As such, during the recipe execution time (i.e., the time that includes all cooking and learning periods 740 and 740, and excludes the end of recipe period 760), a power envelope 770 may be defined that is substantially smaller than the power envelope 730 shown in FIG. 6. Accordingly, if the minimum power during the learning periods 710 is never allowed to reduce to levels below about 15%, the power envelope 770 will necessarily never be allowed to be larger than 85%, and instead will be smaller.

FIG. 9 also shows a corresponding graph of temperature versus time for the power graph of FIG. 7. In this regard, although the maximum operating temperature periods 800 may still generally correspond to the cooking periods 740 of FIG. 7, the minimum operating temperature periods 840 (which generally correspond to the learning periods 740 of FIG. 7) are at higher temperatures than the temperatures experienced during the minimum operating temperature periods 810. The end of recipe period 760 may still define an absolute minimum temperature period 820 that is the same as that shown in the example of FIG. 6 (although it may be reached slower if transient power decreases are delayed). However, the difference between the maximum and minimum temperatures experienced during the maximum operating temperature periods 800 and minimum operating temperature periods 840 clearly define an operating temperature envelope 830. As can be appreciated from FIG. 9, the operating temperature envelope 850 for the example of FIG. 7 that is smaller than the operating temperature envelope 830 that corresponded to the operating conditions shown in FIG. 6. Thus, providing a minimum RF power of greater than 15% or delaying power transients (such that power level is never able to reduce to lower than 15%) should have significant positive impact relative to reducing thermal stresses.

Figure 8:
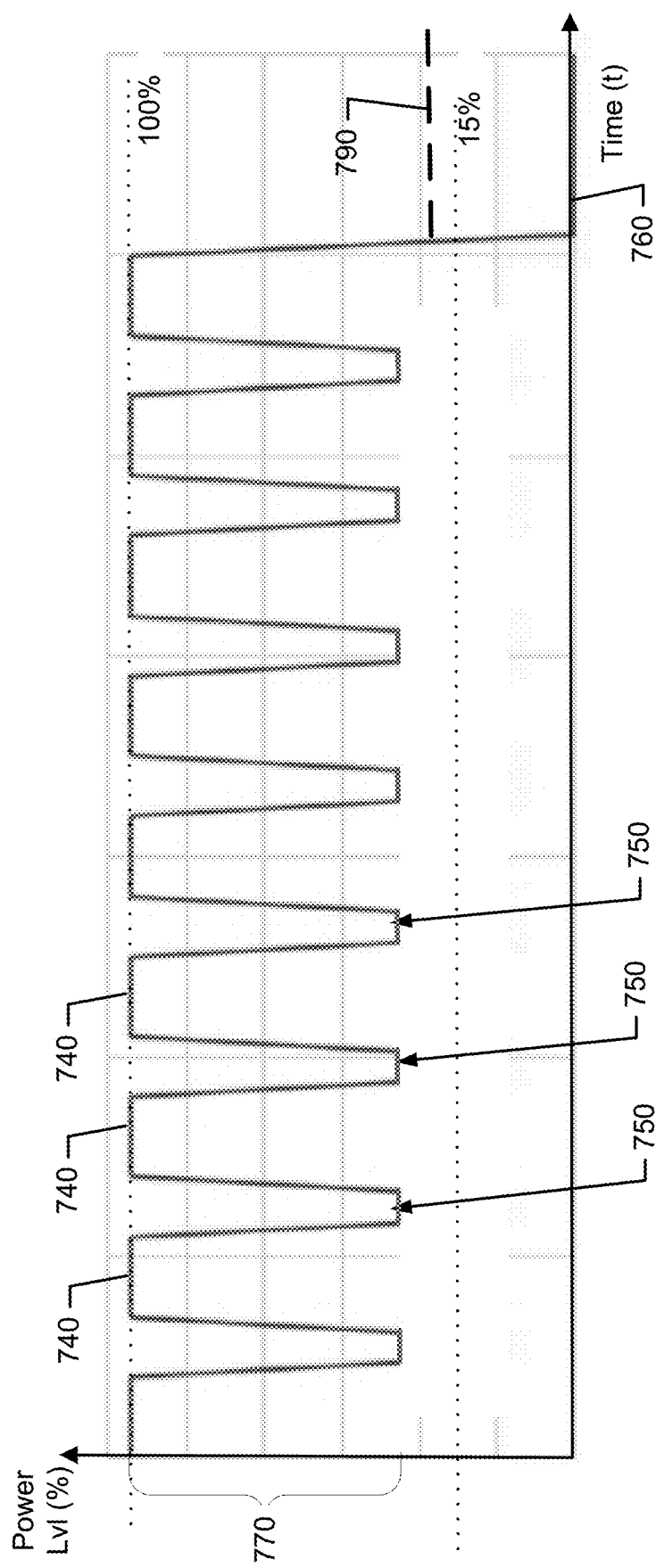
FIG. 8 is a power versus time graph that illustrates results associated with another example of a thermal stress mitigation technique in accordance with an example embodiment.

The thermal stress reductions described above may each be considered to be examples of individual thermal stress mitigation techniques that can be applied alone or in combination with each other. These thermal stress mitigation techniques notwithstanding, each of which can be instituted during recipe execution, it should be appreciated that a large thermal stress could still be experienced during the end of recipe period 760 when RF power is reduced to near zero. Accordingly, it may be desirable to alternatively or additionally institute measures to reduce this thermal stress at the end of execution of a particular recipe. FIG. 8 illustrates a graph of power versus time in which the methods described above in reference to FIG. 7 are already being implemented, but an end of recipe thermal stress reduction strategy is also implemented. That said, it should be appreciated that the strategy that will now be described in reference to FIG. 8 could alternatively be employed in connection with the example of FIG. 6. Thus, end of recipe thermal stress mitigation techniques can be implemented either with or without thermal stress mitigation techniques that are employed during execution of a particular recipe (as shown in the example of FIG. 7).

Referring now to FIG. 8, operation may occur in similar fashion to that described above in reference to FIG. 7 except that when the end of recipe period 760 is reached, a minimum DC bias point for the RF power devices of the power amplifier electronics 224 (which may otherwise be 1% to 5% of the DC current applied at full RF power (i.e., at cooking periods 700 and 740)) may be increased. In this regard, an end of recipe DC bias current 790 is set (e.g., by the control electronics 220) to be above 10% of the DC current applied at full RF power. By applying a larger value than normal for the end of recipe DC bias current 790, the output power envelope could remain unchanged (although as noted above, the power envelope could also be adjusted using the methods described in reference to FIG. 7) and yet the thermal stresses on power amplifier electronics 224 due to power cycling may be reduced. The lack of change in the output power envelope may result in no change at all to the cooking performance of the oven 100. However, the application of the end of recipe DC bias current 790 raises the temperature of the power amplifier electronics 224 relative to the temperatures that would otherwise be experienced at a typical DC bias current during the end of recipe period 760 (e.g., 1% to 5% of DC current at full RF power). The increased temperature during the end of recipe period 760 due to increased dissipated power levels in the power amplifier electronics 224 may reduce the stress on power amplifier electronics 224 since the cycling of temperatures is reduced.

As an example, a device that typically generates 10A of DC current at full RF power would normally have a DC bias current set point of far less than 1A (e.g., 50 mA to 500 mA). However, the device when operated in accordance with an example embodiment may have the end of recipe DC bias current 790 set for above 1 A (i.e., greater than 10% of the DC current applied at full RF power. The device may be expected to experience less than 50% of the junction temperature drop that would normally be experienced in the power amplifier electronics 224 during a transition from full RF power to the near zero power level experienced during the end of recipe period 760. Such a large reduction in junction temperature drop during cycling operation will increase the lifetime of the die employed in the power amplifier electronics 224 and/or the bonding wires that connect the drain/collector on the die of the power amplifier electronics 224 to a wedge/ball bonded terminal of other components of the power amplifier electronics 224. Thus, a more stable temperature value during power cycling can ensure longer life of the oven 100 and its components. As such, it is actually (somewhat counterintuitively) an advantage to maintain higher power and/or DC biasing current within the components of the power amplifier electronics 224 in order to increase their useful life.

As another example, a device with a nominal DC drain supply voltage of 30V and a thermal resistance of about 0.50 K/W (junction to case), may further have a nominal RF output power of 150 W, efficiency at the nominal output power of 50% (hence DC power=150/0.5=300 W and Id=10 A), and a DC bias current (class AB bias) of 0.25 A (thereby generating 0.25 A×30V=7.5 W of dissipated power). The device may have a dissipated power at nominal RF output power of 150 W (i.e., 300 W-150 W). The junction temperature increase at nominal RF output power (junction to case) may be 75 degrees K (i.e., 150 W×0.50 K/W). The junction temperature increase at DC. bias (junction to case)

may be 3.75 degrees K (i.e., 7.5 W×0.50 K/W). Thus, the change in junction temperature at the end of the recipe may be about 71.25K (i.e., 75 K−3.75 K). By employing an example embodiment, where the end of recipe DC bias current 790 is set higher than 10% of the nominal DC bias current, as noted above, a reduction in thermal stresses may be achieved. In particular, for example, if the end of recipe DC bias current 790 is set at 5A, then power dissipated at the end of recipe period would be 150 W (e.g., 5 A×30V=150 W). Accordingly, the junction temperature increase (junction to case) during the end of recipe period 760 would be 75 degrees K (e.g., 150 W×0.50 K/W). As such, the junction temperature drop when transitioning to the end of recipe period 760 would be 0 degrees K (e.g., 75 W (at full RF power)−75 W (at end of recipe)=0). This means that, for this example, the junction temperature variation at the end of recipe period 760 is reduced to zero, and therefore the stress induced by temperature cycling is also reduced to zero for both the die and the bonding wires and/or wedge/ball bonded terminals. Thus, the time to failure of the power amplifier electronics 224 may improve in a range of at least about 5 to about 20 times, due to the lack of temperature cycling even though power otherwise cycles. FIG. 9 illustrates an end of recipe temperature 860 according to this example, which essentially shows a temperature change of zero degrees during the end of recipe period 760 of FIG. 8.

In an example embodiment, an oven (and/or control electronics associated with controlling operations of the oven) may be provided. The oven may include a cooking chamber configured to receive a food product, and an RF heating system configured to provide RF energy into the cooking chamber using solid state electronic components. The solid state electronic components include power amplifier electronics and control electronics configured to control operation of the power amplifier electronics. The power amplifier electronics may be configured to provide a signal into the cooking chamber via a launcher assembly operably coupled to the cooking chamber via a waveguide assembly. The power amplifier electronics may be configured to control application of RF energy into the cooking chamber according to a cooking recipe at least in part based on a learning procedure that generates a power cycling between high and low powers when the learning procedure is executed. The control electronics may be configured to employ a thermal stress mitigation technique to control thermal stresses on the power amplifier electronics associated with the power cycling.

In some embodiments, additional optional features may be included or the features described above may be modified or augmented. Each of the additional features, modification or augmentations may be practiced in combination with the features above and/or in combination with each other. Thus, some, all or none of the additional features, modification or augmentations may be utilized in some embodiments. For example, in some cases, the thermal stress mitigation technique may include setting a DC bias current after execution of the recipe at a level greater than about 10% of DC bias current at full power. Additionally or alternatively, the thermal stress mitigation technique may include applying a minimum power level during execution of the learning procedure at greater than 15% of full power. Additionally or alternatively, the thermal stress mitigation technique may include applying a minimum power level during execution of the recipe at greater than 15% of full power. Additionally or alternatively, the thermal stress mitigation technique may include applying a minimum power level and a maximum power level during execution of the recipe such that a power envelope defined between the minimum and maximum power levels is less than 85% of full power. Additionally or alternatively, the thermal stress mitigation technique may include applying a power change delay (or transient smoothing process) in response to the power cycling. In some cases, the power change delay may be applied responsive to power reduction from full power to a minimum power level associated with the learning procedure. In an example embodiment, the power change delay may also be applied responsive to power increase from the minimum power level associated with the learning procedure to the full power. In some cases, the power change delay may include a series of ramped power changes responsive to power reduction between full power and a minimum power level associated with the learning procedure. In an example embodiment, the ramped power changes may be applied about every 10 ms to 1 s during power increases and power decreases between the full power and the minimum power level associated with the learning procedure.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An oven comprising:
a cooking chamber configured to receive a food product; and
a radio frequency (RF) heating system configured to provide RF energy into the cooking chamber using solid state electronic components to heat the food product,
wherein the solid state electronic components include power amplifier electronics and control electronics configured to control operation of the power amplifier electronics, the power amplifier electronics being configured to provide a signal into the cooking chamber via a launcher assembly operably coupled to the cooking chamber via a waveguide assembly,
wherein the power amplifier electronics are configured to control application of RF energy into the cooking chamber according to a cooking recipe at least in part based on a learning procedure that generates a power cycling between high and low powers when the learning procedure is executed, and wherein the control electronics are configured to employ a thermal stress mitigation technique to control thermal stresses on the power amplifier electronics associated with the power cycling.

2. The oven of claim 1, wherein the thermal stress mitigation technique comprises setting a direct current (DC) bias current after execution of the recipe at a level greater than about 10% of DC bias current at full power.

3. The oven of claim 1, wherein the thermal stress mitigation technique comprises applying a minimum power level during execution of the learning procedure at greater than 15% of full power.

4. The oven of claim 1, wherein the thermal stress mitigation technique comprises applying a minimum power level during execution of the recipe at greater than 15% of full power.

5. The oven of claim 1, wherein the thermal stress mitigation technique comprises applying a minimum power level and a maximum power level during execution of the recipe such that a power envelope defined between the minimum and maximum power levels is less than 85% of full power.

6. The oven of claim 1, wherein the thermal stress mitigation technique comprises applying a power change delay in response to the power cycling.

7. The oven of claim 6, wherein the power change delay is applied responsive to power reduction from full power to a minimum power level associated with the learning procedure.

8. The oven of claim 7, wherein the power change delay is also applied responsive to power increase from the minimum power level associated with the learning procedure to the full power.

9. The oven of claim 6, wherein the power change delay comprises a series of ramped power changes responsive to power reduction between full power and a minimum power level associated with the learning procedure.

10. The oven of claim 9, wherein the ramped power changes are applied about every 10 ms to 1 s during power increases and power decreases between the full power and the minimum power level associated with the learning procedure.

11. Control electronics for controlling power amplifier electronics associated with application of radio frequency (RF) energy generated using solid state electronic components, the power amplifier electronics being configured to control application of RF energy in an oven according to a cooking recipe at least in part based on a learning procedure that generates a power cycling between high and low powers when the learning procedure is executed, wherein the control electronics comprise processing circuitry configured to employ a thermal stress mitigation technique to control thermal stresses on the power amplifier electronics associated with the power cycling.

12. The control electronics of claim 11, wherein the thermal stress mitigation technique comprises setting a direct current (DC) bias current after execution of the recipe at a level greater than about 10% of DC bias current at full power.

13. The control electronics of claim 11, wherein the thermal stress mitigation technique comprises applying a minimum power level during execution of the learning procedure at greater than 15% of full power.

14. The control electronics of claim 11, wherein the thermal stress mitigation technique comprises applying a minimum power level during execution of the recipe at greater than 15% of full power.

15. The control electronics of claim 11, wherein the thermal stress mitigation technique comprises applying a minimum power level and a maximum power level during execution of the recipe such that a power envelope defined between the minimum and maximum power levels is less than 85% of full power.

16. The control electronics of claim 11, wherein the thermal stress mitigation technique comprises applying a power change delay in response to the power cycling.

17. The control electronics of claim 16, wherein the power change delay is applied responsive to power reduction from full power to a minimum power level associated with the learning procedure.

18. The control electronics of claim 17, wherein the power change delay is also applied responsive to power increase from the minimum power level associated with the learning procedure to the full power.

19. The control electronics of claim 16, wherein the power change delay comprises a series of ramped power changes responsive to power reduction between full power and a minimum power level associated with the learning procedure.

20. The control electronics of claim 19, wherein the ramped power changes are applied about every 10 ms to 1 s during power increases and power decreases between the full power and the minimum power level associated with the learning procedure.

* * * * *